(No Model.)

G. WESTINGHOUSE, Jr.
HOSE PROTECTOR.

No. 267,473. Patented Nov. 14, 1882.

UNITED STATES PATENT OFFICE.

GEORGE WESTINGHOUSE, JR., OF PITTSBURG, PENNSYLVANIA.

HOSE-PROTECTOR.

SPECIFICATION forming part of Letters Patent No. 267,473, dated November 14, 1882.

Application filed September 18, 1882. (No model.)

*To all whom it may concern:*

Be it known that I, GEORGE WESTINGHOUSE, Jr., of Pittsburg, county of Allegheny, State of Pennsylvania, have invented or discovered a new and useful Improvement in Hose-Protecting; and I do hereby declare the following to be a full, clear, concise, and exact description thereof, reference being had to the accompanying drawings, making a part of this specification, in which—like letters indicating like parts—

Figure 1:
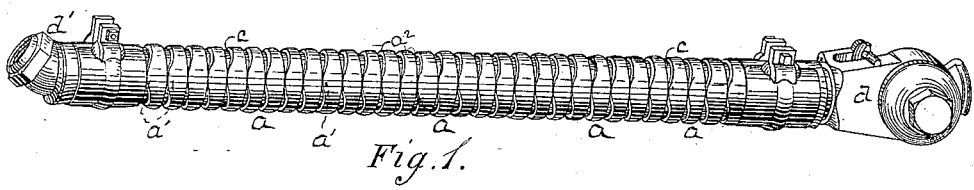
Figures 2, 3:
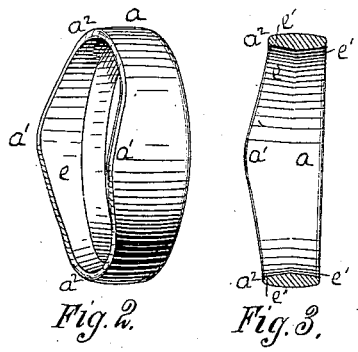

Figure 1 shows a section of air-brake hose clothed or covered with a series of metallic rings such as I propose to use, and Figs. 2 and 3 show to an enlarged scale perspective and sectional views of one of the rings.

In the use of flexible hose for making connection in fluid-pressure-brake apparatus between the fixed pipes of contiguous cars it has been found desirable to have the exterior of the hose protected as against injury from without by a metallic covering of some kind; but the conditions of use require that such a covering should be flexible or capable of assuming the various bends or curvatures which the hose in use must necessarily take. To accomplish both these objects I employ a series of metallic rings, $a$; but instead of making the ends of such rings plain I make the rings of any desired irregular shape at one or both ends, so that the projecting parts of such ends shall afford means for the turning of one on another laterally or out of axial alignment. One convenient shape for the purpose in view is illustrated in the drawings, where one end of each ring is enlarged or swelled out on two annularly-opposite sides and in the direction of the ring's length, as at $a'$. The rings made thus, or in other like manner, are slipped onto the hose $c$, so as to form a covering for such hose from the half-coupling $d$ to the nozzle or thimble $d'$, or from the fastening-clamp of one to the fastening-clamp of the other, or along so much of the length of the ring as it is desired to protect. Preferably they are put on so that the projection (if only one be made) or projections $a'$ on one end of one ring shall bear against the plain end of the next ring. Then the point or apex of each projection forms a kind of a pivot or fulcrum on which such two rings turn with reference to each other, and the intermediate or depressed parts, $a^2$, of the ring end give room for flexure, or for the tilting of one ring out of a strict alignment, axially considered, with the next ring. The rings may be put on in orderly array, as in Fig. 1—that is, with the apexes in line—so that one line of depressions $a^2$ shall come on the inside of the curve which the hose naturally takes when two half-couplings are united; or the rings may be put on without regard to the alignment of the apexes of the rings, in which case it will follow that the projections $a'$ of the different or successive rings will never be in line with each other, and hence that as depressed places $a^2$ will come on all sides of the hose the latter may readily bend or be curved in any direction to the extent required in this branch of the art. Thus the material of which the hose is made will be protected as against injury by blows or other force from without, and the desired degree of flexibility will also be preserved; also, if the rings are made of proper interior diameter to fit the hose closely, they will aid materially in preventing the disruption or bursting of the hose under the strain of the air under pressure when employed as a part of a compressed-air-brake apparatus, but when used as a part of a vacuum-brake apparatus this last feature is less important. In order to prevent the hose from being cut or worn by the inner end corners, it is better to taper them internally, as at $e$, or, at least, to round or bevel somewhat the inner end corners, as at $e'$.

I do not limit myself to any particular irregular end shape for the rings, provided that it be such at either one or both ends of the rings that the points or apexes of the projections may act as pivots for the rings to turn on, as described, and to the extent required; nor is it essential that every ring should be so shaped, as some of the rings may be square-ended, provided the other of such rings have comparatively full projections, so as to provide for the hinge motion referred to.

I am aware of and hereby disclaim the hose-protectors described in United States Patent No. 200,493, of February 19, 1878. My own differ from these, among other things, in the fact that they consist of rigid unbroken rings disconnected from each other, and consequently are more easily made and applied.

I claim herein as my invention—

1. As a covering for a hose-pipe, a series of unbroken rings, each encircling the hose, and some or all of which have irregularly-shaped ends, substantially as set forth.

2. The combination of a flexible hose and a series of unbroken rings thereon, each encircling the hose, when some or all such rings have an end shape such as to form a pivoting point or points for the turning of one ring on another, substantially as set forth.

3. A hose-protecting ring, $a$, having one or more end projections, $a'$, and depressions $a^2$ on one or both ends thereof, substantially as set forth.

4. A hose protecting ring, $a$, having one or more end projections, $a'$, depressions $a^2$, and interior rounded or beveled end corners, $e'$, substantially as set forth.

In testimony whereof I have hereunto set my hand.

GEO. WESTINGHOUSE, JR.

Witnesses:
R. H. WHITTLESEY,
GEORGE H. CHRISTY.